United States Patent
Wildmann et al.

(10) Patent No.: US 6,909,799 B1
(45) Date of Patent: Jun. 21, 2005

(54) METHOD AND APPARATUS FOR FOLLOWING AND INSPECTING AN EDGE OR BORDER

(75) Inventors: Daniel Wildmann, Dielsdorf (CH); Christa Buchmann, Embrach (CH)

(73) Assignee: Elpatronic AG, Bergdietikon (CH)

( * ) Notice: Subject to any disclaimer, the term of this patent is extended or adjusted under 35 U.S.C. 154(b) by 822 days.

(21) Appl. No.: 08/899,848

(22) Filed: Jul. 24, 1997

(30) Foreign Application Priority Data

Jul. 29, 1996 (CH) .............................. 1882/96

(51) Int. Cl.⁷ ................................. G06K 9/00
(52) U.S. Cl. .................................... 382/152
(58) Field of Search ................... 382/141, 149, 382/151, 152, 199, 266, 100, 150, 154; 356/376, 377; 296/233

(56) References Cited

U.S. PATENT DOCUMENTS

| | | | |
|---|---|---|---|
| 4,491,719 A | | 1/1985 | Corby, Jr. .............. 219/124.34 |
| 4,525,858 A | * | 6/1985 | Cline et al. ................. 382/154 |
| 4,529,289 A | * | 7/1985 | Tsunefuji et al. ........... 396/233 |
| 4,918,517 A | | 4/1990 | Burgoon |
| 5,533,146 A | * | 7/1996 | Iwai ............................ 382/150 |
| 5,570,186 A | * | 10/1996 | Satzger et al. .............. 356/376 |
| 5,793,493 A | * | 8/1998 | Lane .......................... 356/376 |

FOREIGN PATENT DOCUMENTS

| | | |
|---|---|---|
| DE | 39 40 518 A1 | 6/1991 |
| EP | 0 563 829 A | 10/1993 |
| GB | 2 264 602 A | 9/1993 |
| JP | 63-005 880 A | 11/1988 |
| JP | 6-058 726 A | 4/1994 |

* cited by examiner

*Primary Examiner*—Vikkram Bali
(74) *Attorney, Agent, or Firm*—McCormick, Paulding & Huber LLP

(57) ABSTRACT

To follow and inspect a common edge between two sheet metal blanks which are to be welded together, a line pattern is projected across the edge by a projector and is imaged by a camera. The image captured is analyzed in order to derive from the trace of the lines information on the gap between the blanks, or on the track of the edge. The pattern projected has several lines with different light intensities. When the photographed image is processed, it is then possible—even if there is variation in the reflection characteristics of the sheet metal blanks—to select a line which is neither too faint nor too bright in the image obtained and which can therefore be used for meaningful analysis.

12 Claims, 1 Drawing Sheet

METHOD AND APPARATUS FOR FOLLOWING AND INSPECTING AN EDGE OR BORDER

BACKGROUND OF THE INVENTION

The invention relates to a method and apparatus for welding sheet metal blanks along a common edge and following the edge before welding and/or inspecting the edge or weld seam after welding.

The welding together of metal sheets to form larger components (so-called tailored blanks), which are subsequently subjected to a forming process, is known. One example of a field in which such "tailored blanks" are used is the motor vehicle industry. The welding together of the metal blanks may be performed by mesh welding and laser welding. Because the weld seam is subjected to the forming process along with the blanks, it is essential that the entire seam should be of sound quality.

The blanks to be welded are fed to the welding point with the edges to be welded together touching. It is important that the focussed laser beam should follow the common edge of the juxtaposed blanks as accurately as possible. To achieve this, use is made of devices which determine the precise track of the edge ahead of the welding zone, thus enabling the laser beam to be guided accordingly during welding. One known device does this by projecting a line pattern of constant intensity transversely across the edge, this pattern is imaged by a camera, and the image obtained is analysed by computer in order to derive from the trace of at least one of the lines the track of the common edge, or of the gap between the blanks at that point. In this way, the edge and the gap are tracked along their entire length ahead of the welding zone and the laser beam is controlled accordingly as welding is performed.

After the welding zone, the profile of the weld seam can be determined in a similar manner, allowing weld defects to be detected.

Both in following the edge before welding and—especially—in inspecting the edge or weld seam after welding, the problem arises that there is much variation in the reflectivity of the sheet-metal blanks. The individual blanks may have different surface coatings; an oil film, or no oil film, a bright or dull finish, smoke traces, etc. The large differences in brightness due to these factors may go beyond the dynamic range of the camera employed, causing the lines to be imaged too brightly or too dimly and making the image difficult or perhaps even impossible to interpret. If following an edge, it may be necessary to reduce the rate of travel, or weld defects may occur; if inspecting an edge, defects may be difficult to detect in some cases, or defects may be assumed where none exist.

Therefore, the problem which the invention seeks to solve is to improve the method of the kind stated at the outset and/or the apparatus of the kind stated at the outset so as to enable the captured image to be analysed without any problems, even under adverse conditions.

SUMMARY OF THE INVENTION

In accordance with a first aspect of the invention, this is achieved by projecting light onto the blanks in the form of a plurality of lines of a different light intensity and extending transversely across the edge, and evaluating the image of the lines captured by a camera. An evaluation means selects the lines for evaluation on the basis of the brightness of the scattered or reflected radiation. Projecting lines of different brightness onto the blanks enhances the interpretability of the picture. On a bright, highly reflective blank, the evaluation unit can use a correctly imaged line of lower intensity for the evaluation, and to disregard the over-bright lines of higher intensity. On a dark, poorly reflective blank, the line with greatest intensity can yield good results. In this way, a very good result can easily be obtained in both edge-following and edge inspection.

The light intensities of individual lines may be different, and may lie eg. between 15% and 100%; lines with equal intensity may also be provided. In a preferred example, five lines are provided, with intensities of 25% (two lines), 50% (two lines) and 100% (one line).

In accordance with another aspect of the invention, the problem is solved by an evaluation means having a variable exposure control for modifying the exposure of subsequent images by transmitting a control signal to the camera capturing the image. In the event the camera is a CCD camera, the signal can control the integration time of the CCD element or shutter speed.

In this case, every image analysis determines whether the brightness of the lines lies within specified limits; if not, a control signal is generated which acts on the exposure control of the camera device for the next shot, so that the next picture is brighter or darker. It is also possible to combine both aspects of the invention, so that control of the camera exposure on the basis of the result of the image just viewed is performed in addition to the use of lines of different brightness.

In accordance with a third aspect of the invention, the problem is solved by a projector which is controllable in light intensity for projecting the lines, and as part of the evaluation of each image a determination is made for midifying the next image and a control signal is produced for that purpose.

Varying the brightness or intensity of the projector overall makes it possible to compensate for the reflectivity of different blanks.

BRIEF DESCRIPTION OF THE DRAWINGS

Embodiments of the invention given by way of example will now be described in detail with reference to the figures, in which.

DESCRIPTION OF THE PREFERRED EMBODIMENTS

Figure 1:
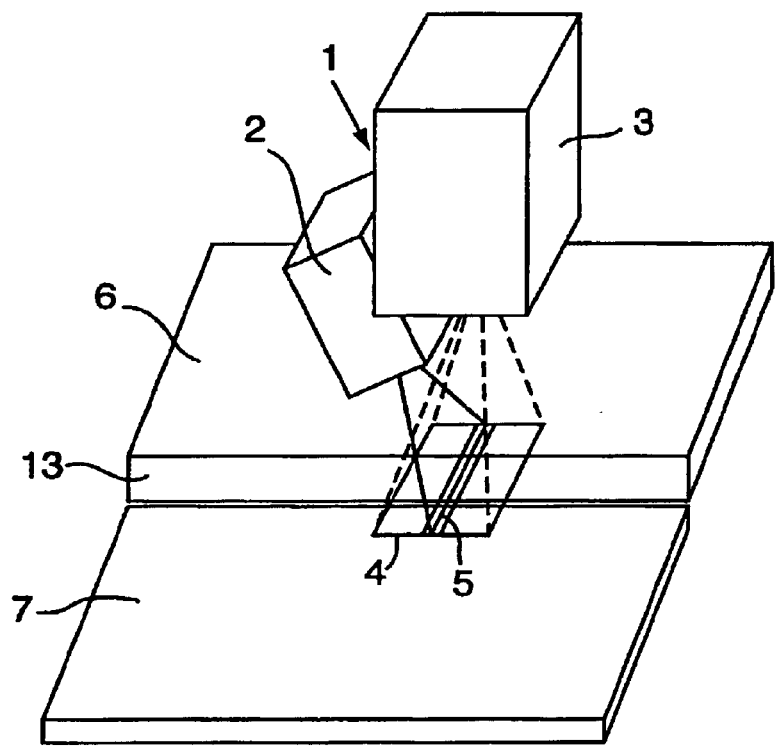
FIG. 1 shows schematically a basic arrangement of line projector and camera.

FIG. 1 shows two blanks 6 and 7 which are juxtaposed and have a common edge 13. These blanks are joined together along the edge 13 eg. by laser welding. To follow the track of the edge and/or to inspect the weld seam, it is known to project a number of lines 5 of light transversely across the edge 13 onto the said edge and the adjacent region of the two blanks. In the example shown, only three lines are illustrated, but some other number of lines could be employed. The lines extend at a 90° angle to, or at an oblique angle to, the edge 13, within the field of view of an imaging device 3, which may in particular be a CCD camera. The projector 2 for projecting the lines 5 is preferably formed by a laser light source in front of which a diffraction grating is arranged to generate the lines 5 as diffraction lines. The image captured by the camera 3 is analysed in an image evaluation unit to determine from the track of at least one of the lines 5, the track of the gap between the blanks 6 and 7 along the edge 13, or, as the case may be, to determine the track of the weld seam after the blanks are welded.

Figure 2:
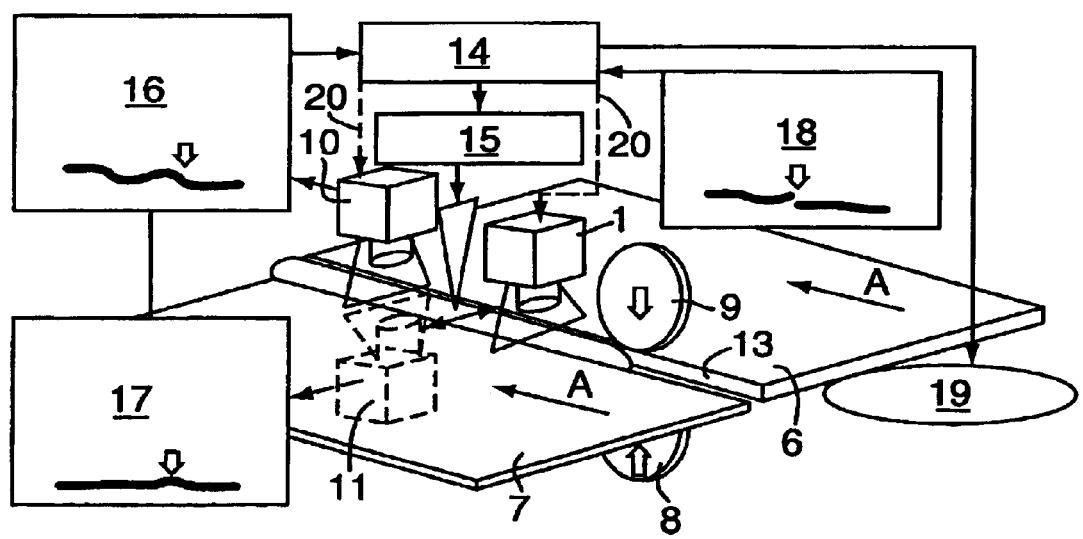
FIG. 2 is a schematic illustration with one edge-following apparatus and two edge or weld inspection apparatus.

FIG. 2 shows such an apparatus in which a number of arrangements according to FIG. 1 are provided, namely an arrangement 1 ahead of the welding zone and two arrangements 10 and 11 trailing the welding zone. As can be seen from FIG. 2, the blanks 6 and 7, which may be eg. 2 m long in the welding direction, are carried through the apparatus in the direction of the arrows A by a conveyor device (not shown) with their position precisely located. A metal reforming device having rollers 8 and 9 may be provided ahead of the edge-following apparatus 1. By deforming the thicker blank 6, this device reduces any gap between the blanks to a minimum. The precise track of the gap is then determined by the edge-following arrangement 1, as already described, by projecting a pattern of lines across the edge 13 and by observing by means of a camera, and evaluating, the line pattern. For example, five parallel lines may be projected across the edge by the projection device. The image from the camera of the arrangement 1 passes to an evaluation unit 18 which determines the precise track of the gap. The evaluation unit 18 transmits control signals to a control unit 14, which, in turn, controls the laser light source 15 so that the laser light beam (shown only schematically) for welding the blanks 6 and 7 exactly follows the track of the gap along the edge 13.

After the welding zone (ie. in the conveying direction), behind the laser beam, an arrangement 10 similar to that shown in FIG. 1 is disposed above the weld seam, and a further arrangement 11 similar to that shown in FIG. 1 is disposed underneath the blanks. These two arrangements also project lines across the edge 13, and hence across the weld seam. From the images of the lines, the evaluation units 16 and 17 are able to determine the track of the weld seam and hence to carry out a weld inspection for various kinds of defect, as is known in itself, and will not be described in detail here. The evaluation units 16 and 17 transmit an appropriate signal to the control unit 14 and this may transmit a signal to a higher-ranking control 19 to indicate whether the composite panel consisting of the welded blanks 6 and 7 satisfies, or fails to satisfy, the quality requirements.

In accordance with one aspect of the present invention, the lines 5 are projected in such a way that different lines have different light intensities. For example: of the three lines shown in FIG. 1, the brightest line could have a light intensity of 100% a second line could have a light intensity of 60%, and a third line could have a light intensity of 30%. In a preferred embodiment, five lines are projected as diffraction lines. In this embodiment the central diffraction line of zero order has eg. the intensity of 100%. Each of the first-order diffraction lines on either side of the first diffraction line has an intensity of 50%, and each of the outlying second-order diffraction lines has a light intensity of 25%. Line projectors with lasers and diffraction gratings capable of meeting the said requirements are manufactured eg. by LASIRIS INCORPORATED of 3549 Ashby, Quebec, Canada.

Owing to the different light intensities of the lines 5, the images captured by the camera 3 can provide good detectability of at least one of the lines, even where there are different reflectivities of the blank surfaces along the edge 13, and, after selection of the appropriate line or lines by the evaluation unit, good evaluation of the image is possible. In this way the track of the gap, or the track of the weld seam, can be precisely established even under difficult reflection conditions at the surface of the sheet metal.

In accordance with another aspect of the invention, the individual cameras receive an exposure control signal 20 which in FIG. 2 is shown transmitted by the control unit 14, but which could also be transmitted to the camera directly by the associated evaluation unit 18 or, as the case may be, 16 or 17. The control signal 20 contains the information that the camera should select an exposure time which is longer or shorter than, or equal to, that of the previous picture when it captures the next image. If the camera used is a CCD camera, the control signal may regulate the integration time of the CCD element, instead of the exposure time. On the basis of the information that the preceding image of the lines 5 has been too dark or too bright, the exposure of the camera concerned is thus modified for the next shot. Consequently this capability also affords an enhancement of the recognition of the projected lines in the images obtained. Preferably, the integration is always made over the same length of edge or seam, regardless of the rate of travel.

Both aspects of the invention can also be used in combination. Lines of different intensity can be projected across the edge 13, and, in addition, provision can be made for modifying the exposure of an individual camera. Suitable cameras, in particular CCD cameras, are commercially available, and do not need to be described in detail here.

In accordance with a further aspect of the invention, the total brightness of the projected lines can be controlled. In this case, it is not the exposure time of the camera or the integration time of the CCD element that is modified by a signal from the evaluation unit, but the brightness of the line projector. This facility can be combined with either or both of the two aspects previously described. Thus, the brightness of a line projector which projects lines of equal intensity may be controlled, or the brightness of a line projector which produces lines of different intensity may be controlled, as described above. Control of brightness may also be combined with control of exposure time or of integration time, with the controlling unit in this case outputting two control signals, one for the projector and one for the camera.

The three aspects of the invention may be presented as follows:

| Step | | EFFECT |
| --- | --- | --- |
| 1. | Lines of different intensities projected by line projector. | Local differences in reflectivity across edge or seam can be compensated. |
| 2. | Integration time or shutter speed of camera CCD element modified (preferably so that integration is always made over the same length of edge or seam) | Adjustment of exposure and hence image always of the same brightness, preferably with constant resolution regardless of rate of travel. |
| 3. | Control of basic intensity of output from line projector. | Equal brightness of the scattered and reflected light regardless of the general reflection characteristics of the sheet metal blank. |

What is claimed is:

1. A method for following the common edges of sheet metal blanks before welding the edges and/or for inspecting the edges or a weld seam formed at the edges after welding the edges comprising:

projecting a plurality of lines of light having different intensities across the edges;

capturing an image of the lines by means of a camera; and evaluating the image of the lines, including selecting at least one of the lines for evaluation on the basis of the scattered or reflected radiation of the line.

2. Method according to claim 1, wherein the lines have light intensities in the range of 100% to 5%.

3. Method according to claim 1 wherein additional lines are projected that are of equal intensity to respective lines of said lines of different light intensity.

4. Method according to claim 3, wherein five lines are projected: one line with an intensity of 100%, two lines with an intensity of 50%, and two lines with an intensity of 25%.

5. Method according to claim 4, wherein the five lines are produced by a diffraction grating, a central line of zero diffraction-order having 100% intensity, lines of first diffraction-order lying on either side of the central line having 50% intensity and outer lines of second diffraction-order having 25% intensity.

6. Method according to claim 2 wherein additional lines are projected that are of equal intensity to respective lines of said lines of different light intensity.

7. Apparatus for following the common edges of sheet metal blanks before welding the edges and/or for inspecting the edges or a weld seam formed at the edges after welding the, edges comprising:

means for projecting a plurality of lines of light having different intensities across the edges;
a camera for capturing an image of the lines; and
an evaluation means for evaluating the image,
said evaluation means selecting at least one line for evaluation on the basis of the brightness of the scattered or reflected radiation of the line.

8. Apparatus according to claim 7, wherein the means for projecting a plurality of lines comprises a laser light source and a diffraction grating.

9. Apparatus according to claim 8, wherein the means for projecting a plurality of lines projects five diffraction lines, including a zero-order diffraction line having an intensity of 100%, first-order diffraction lines having an intensity of approximately 50% and second-order diffraction lines having an intensity of approximately 25%.

10. Apparatus according to claim 7, wherein the camera comprises at least one CCD camera.

11. A method for following the common edges of sheet metal blanks before welding and/or for inspecting the edges or a weld seam formed at the edges after welding, comprising:

projecting, with a projector having a controllable light intensity, a plurality of lines of light across the edges;

capturing the image of the lines by means of a camera;

evaluating the image of the lines, including determining whether the brightness of the lines needs modifying for the next image, and, if so, transmitting a control signal to the projector to modifying the intensity of the projector.

12. Apparatus for following the common edges of sheet metal blanks before welding and/or for inspecting the edges or a weld seam formed at the edges after welding, comprising:

means for projecting a plurality of lines of light across the edges, said means including a light source having a controllable light intensity;

a camera for capturing an image of the lines;

an evaluation means for evaluating the image, including determining whether the brightness of the lines needs modifying, and wherein the evaluation means is arranged to output a control signal for, responsive to the determination of whether the brightness of the lines needs modifying, controlling the intensity of the light source.

* * * * *